United States Patent
Qiao (10) Patent No.: US 7,675,902 B2
(45) Date of Patent: *Mar. 9, 2010

(54) METHOD FOR REALIZING SIGNALING AGENT BASED ON MEGACO PROTOCOL

(75) Inventor: Kezhi Qiao, Shenzhen (CN)

(73) Assignee: Zte Corporation, Shenzhen, Guangdong Province (CN)

( * ) Notice: Subject to any disclaimer, the term of this patent is extended or adjusted under 35 U.S.C. 154(b) by 662 days.

This patent is subject to a terminal disclaimer.

(21) Appl. No.: 10/567,136

(22) PCT Filed: Dec. 26, 2003

(86) PCT No.: PCT/CN03/01130

§ 371 (c)(1),
(2), (4) Date: Feb. 6, 2006

(87) PCT Pub. No.: WO2005/015863

PCT Pub. Date: Feb. 17, 2005

(65) Prior Publication Data

US 2006/0198357 A1 Sep. 7, 2006

(30) Foreign Application Priority Data

Aug. 6, 2003 (CN) ................. 03 1 40107

(51) Int. Cl.
*H04L 12/66* (2006.01)
(52) U.S. Cl. ................ 370/352; 370/384; 370/373; 370/377; 370/496; 370/357; 370/389; 370/328
(58) Field of Classification Search ............ 370/410, 370/392, 475, 249, 352, 419, 329, 467, 338, 370/328, 356, 401, 250, 221; 709/217, 227, 709/223, 224; 455/432.1, 406, 507

See application file for complete search history.

(56) References Cited

U.S. PATENT DOCUMENTS

| 6,728,356 | B1 * | 4/2004 | Carroll ................... 379/201.01 |
| 6,832,254 | B1 * | 12/2004 | Scoggins et al. ............ 709/227 |
| 6,870,845 | B1 * | 3/2005 | Bellovin et al. ............. 370/392 |
| 6,885,658 | B1 * | 4/2005 | Ress et al. .................. 370/352 |
| 7,068,647 | B2 * | 6/2006 | Fangman et al. ............ 370/352 |
| 7,146,410 | B1 * | 12/2006 | Akman ....................... 709/220 |

(Continued)

OTHER PUBLICATIONS

"RFC 3525-Gateway Control Protocol Version 1" by the Network working Group, published Jun. 2003. (see whole document).*

*Primary Examiner*—Pankaj Kumar
*Assistant Examiner*—Yosief Berhane
(74) *Attorney, Agent, or Firm*—Morris, Manning & Martin LLP; Tim Tingkang Xia (57) ABSTRACT

A method for realizing signaling agent in a network system, the network system comprises media gateways and a media gateway controller in different networks, and at least one agent equipment on a boundary of different networks; each media gateway under the same media gateway controller has a unique message identifier of MEGACO signaling, the media gateway controller distinguishes different media gateways on the basis of the message identifier; the message identifier of the media gateway includes information of the media gateway; the message identifier of the media gateway controller includes information of the media gateway controller and the media gateway, the agent equipment utilizes the message identifier to realize signaling traversing between the media gateway and the media gateway controller. In the present invention, the agent equipment does not need to be configured with any information about the media gateway, and the media gateway controller does not need to recognize the existence of the agent equipment between itself and the media gateway, which facilitates realizing services on the media gateway controller and administration.

6 Claims, 4 Drawing Sheets

U.S. PATENT DOCUMENTS

| | | | |
|---|---|---|---|
| 7,224,696 B2 * | 5/2007 | Bouleros et al. | 370/401 |
| 7,283,519 B2 * | 10/2007 | Girard | 370/353 |
| 7,293,080 B1 * | 11/2007 | Clemm et al. | 709/223 |
| 7,369,535 B2 * | 5/2008 | O'Brien et al. | 370/352 |
| 7,451,207 B2 * | 11/2008 | Oliver | 709/224 |
| 2002/0141390 A1 | 10/2002 | Fangman et al. | |
| 2003/0033418 A1 * | 2/2003 | Young et al. | 709/230 |
| 2003/0227905 A1 | 12/2003 | Bouleros et al. | |
| 2004/0024902 A1 * | 2/2004 | Mikkola | 709/238 |

* cited by examiner

METHOD FOR REALIZING SIGNALING AGENT BASED ON MEGACO PROTOCOL

FIELD OF THE INVENTION

The present invention generally relates to a field of communication technology, and in particular to a method for realizing media stream forwarding among networks by utilizing signaling agent of a media gateway control (MEGACO) protocol.

BACKGROUND

A MEGACO protocol is a RFC3015 protocol of the Internet Engineering Task Force (IETF).

Figure 1:
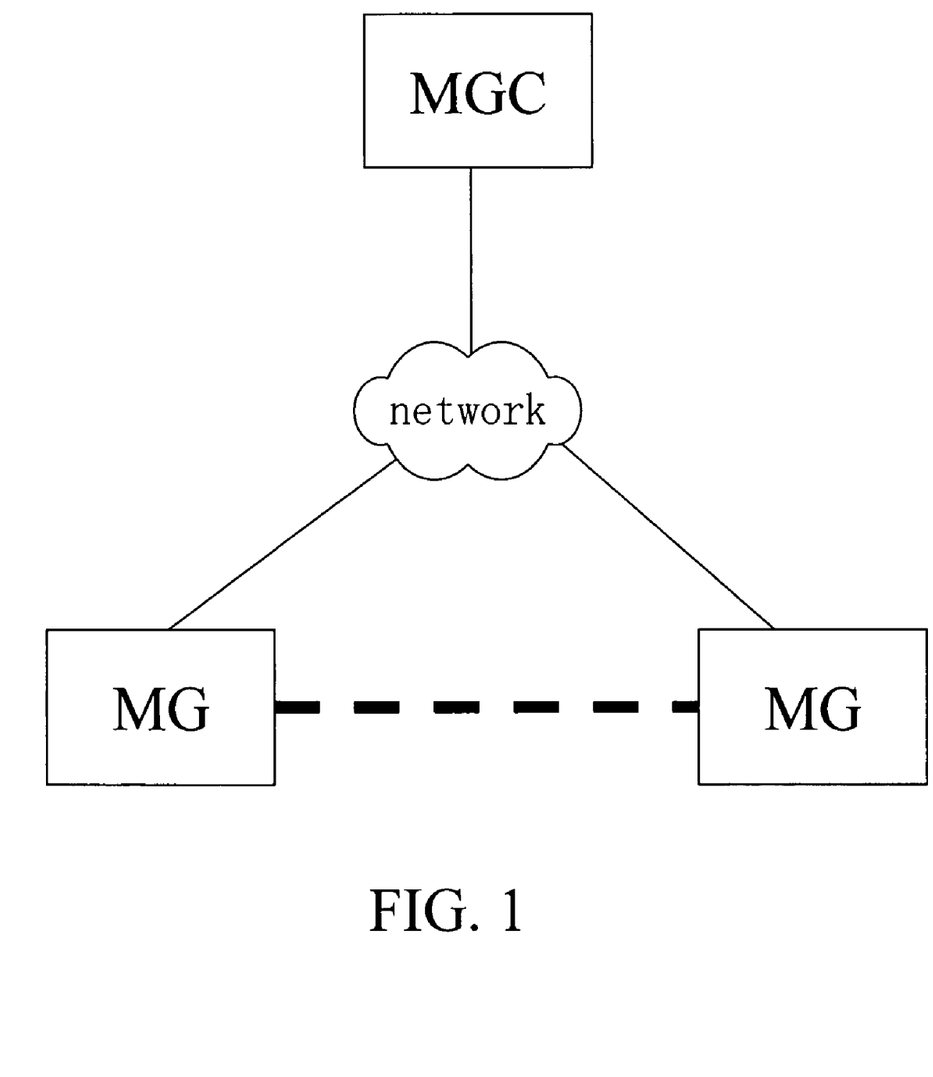
FIG. 1 is a schematic diagram showing a MEGACO protocol system in a prior art.

FIG. 1 is a schematic diagram of implementing system networking of the MEGACO protocol, in which the dot line represents a media stream. With an idea of adopting decomposed gateway, the MEGACO protocol decomposes original centralized processing gateway of signaling and media into two parts: media gateway (MG) and media gateway controller (MGC). The media gateway controller MGC controls media gateway (MG) action with a MEGACO protocol. When the media gateway controller (MGC) sends a command of performing to the media gateway (MG), the media gateway (MG) executes the command and then returns the result. The media gateway MG may also initiatively report observed events to the media gateway controller (MGC) for executing. A logical relation in MEGACO protocol is represented by a link model, and two essentially basic members in this link model are contexts and terminations, in which terminations are a logic entities of media gateway (MG) for sending and/or receiving one or multiple media streams, and contexts is a relationship of connection and topology among terminations.

Main commands between media gateway controller (MGC) and media gateway (MG) include SERVICE-CHANGE, ADD, MODIFY, SUBTRACT and NOTIFY commands, etc.

A signaling agent means that media gateway controllers (MGC) and media gateways (MG), in different networks and not being reachable to one another by routes, realize MEGACO signaling traversing and traversing media streams controlled by MEGACO signaling through networks through signaling agent, so as to make media gateway controllers enable to control media gateways (MG) in other networks completing call establishing and media streams intercommunicating between different networks.

Conventional methods for realizing signaling and media agent based on network address translation (NAT) can not implement entire transparence of agent equipments to media gateway controller (MGC), so that it can not implement direct control of media gateway controller (MGC) on media gateways (MG) in other networks not being reachable to one another by routes, thus the complexity of call services on media gateway controller is increased and meanwhile it needs to configure detailed information of corresponding media gateways (MG) on agent equipment. When a media gateway (MG) has changed, it needs to change configuration on both the media gateway controller (MGC) and the agent equipment simultaneously, and thereby operation maintenance cost is increased.

SUMMARY OF THE INVENTION

The technical problem to be solved in the present invention is to provide a method for realizing signaling agent to implement that MEGACO signaling and media controlled by MEGACO signaling can be transparently traversed through different networks, and the media network controller controls on media gateways in another network as expediently as in the same network for realizing multiple value-added functions in call services; meanwhile in which no media gateway information needs be configured on the agent equipment, and media gateway information is dynamically generated according to MEGACO signaling by agent equipments, so that management on operating the media gateway controller and agent equipments is simplified when media gateways are changed.

The present invention provides a method for realizing signaling agent in a network system, in which the network system comprises media gateways and a media gateway controller in different networks, and at least one agent equipment on a boundary between different networks, MEGACO protocol is adopted between media gateways and the media gateway controller; the agent equipment has at least two network addresses, one is a first network address in a network of media gateway controller side, the other one is a second network address in a network of a media gateway side; the method comprises the following steps of:

step 1: a media gateway registering to the media gateway controller, and the agent equipment recording dynamically message identifier information of the media gateway to be registered and network address according to the register message;

step 2: for a MEGACO signaling that is unconcerned with media stream port of media gateway, the agent equipment directly forwarding according to message identifier in the signaling; and step 3: for a MEGACO signaling that is concerned with media stream port of media gateway, the agent equipment analyzing and processing media stream attribute in the signaling correspondingly and then forwarding according to message identifier in the signaling.

In the method of the present invention, each media gateway under control of the same media gateway controller has a unique message identifier in MEGACO signaling, and the media gateway controller distinguishes different media gateways on the basis of the message identifier.

In the method of the present invention, message identifier of each MEGACO signaling sent to the media gateway by the media gateway controller includes message identifier of the media gateway.

In the method of the present invention, IP address and port of the media gateway controller configured on the media gateway have same configuration with the second network address and signaling port of the agent equipment.

In the method of the present invention, the registering procedure in step 1 comprises the following steps of:

(1) the media gateway sending register message to the media gateway controller, the agent equipment receiving the message at the second network address and the corresponding signaling port, recording IP source address and port number of the media gateway sending the message, and message identifier of the media gateway, etc, to generate a piece of information about the media gateway;

(2) the agent equipment forwarding the register message to the media gateway controller through the first network address;

(3) the media gateway controller registering the media gateway according to message identifier thereof, after registering successfully, the media gateway controller returning a reply signaling to the media gateway, message identifier of the reply signaling including message identifiers of both the media gateway and the media gateway controller; and (4) the agent equipment receiving the reply signaling from the first network address, analyzing the message identifier of the media gateway in the reply signaling, searching and obtaining address of the media gateway from information recorded, and forwarding to corresponding media gateway through the second network address.

In the method of the present invention, the step 3 further comprises:

(1) the agent equipment establishing or modifying corresponding media stream forwarding port and forwarding table after the agent equipment receives the MEGACO signaling of establishing or modifying media stream port sent to the media gateway by the media gateway controller, replacing corresponding media address information in the MEGACO signaling with corresponding network address information of the media forwarding port on the agent equipment, and then forwarding the signaling to corresponding media gateway;

(2) the media gateway processing the MEGACO signaling received, and returning a reply signaling;

(3) the agent equipment modifying forwarding table of corresponding media stream forwarding port according to the reply signaling received, replacing media address information in the signaling by corresponding network address information of the media stream forwarding port at the agent equipment, and forwarding to the media gateway controller; and (4) after calling ends, the media gateway controller sending subtracting signaling for releasing media stream port to the media gateway, after the agent equipment receives the signaling, releasing the corresponding media stream forwarding port, and forwarding the signaling to corresponding media gateway.

In the method of the present invention, the step 3 further comprises: if the signaling received by the agent equipment is a reply signaling of establishing media stream port, the agent equipment further recording termination ID of the media stream port of the media gateway and determining media stream forwarding port to be released according to the termination ID.

In the method for realizing signaling agent based on MEGACO protocol provided by the present invention, it does not need to configure any information of media gateway based on MEGACO protocol in the agent equipment because of adopting technical solutions mentioned above, and the media gateways are controlled by directly the media gateway controller. The media gateway controller does not recognize existence of the agent equipment between itself and the media gateway, and the media gateway controller may not concern with whether the media gateway are in same network with itself, which facilitates to implement multiplex services on the media gateway controller. Meanwhile it brings great convenience to operation and administration and maintenance. Any modification on media gateway service control will be only performed on the media gateway controller, which does not need to perform at the agent equipment again. Furthermore according to the present invention multiple agent equipments may be used for implementing the media gateway traversing through more networks for multiple times, stage by stage.

DETAILED DESCRIPTION OF THE INVENTION

The technical solutions of the present invention will be further described in details in accompanying with the drawings attached and embodiments below.

Figure 2:
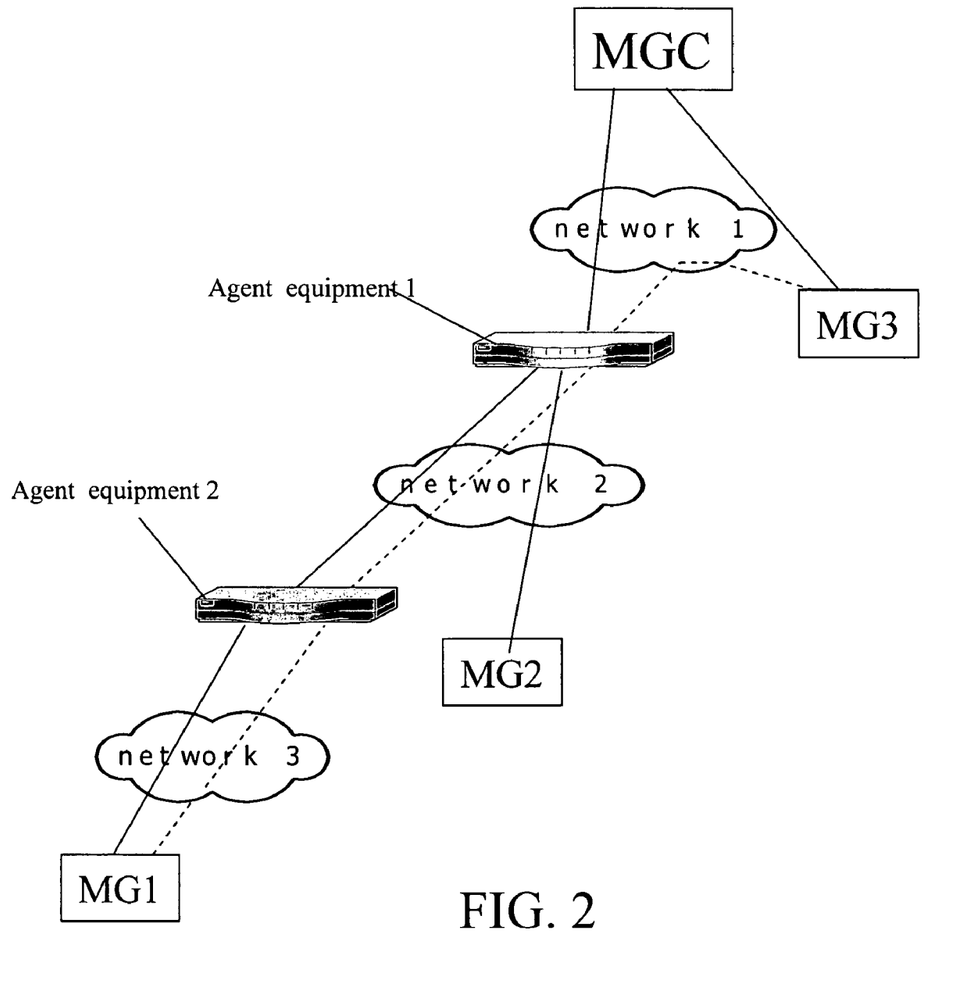
FIG. 2 is a schematic graph of a network system in one embodiment of the present invention for realizing MEGACO signaling agent.

A technical solution for solving technical problems by the present invention is summarized below: a media gateway (MG) and a media gateway controller (MGC) locate in different networks, and transparent traversing of MEGACO signaling through networks is realized by signaling agent function of at least one agent equipment. FIG. 2 is schematic graph of a network system with application of the method of the present invention in which the dot line represents media stream. The media gateway controller MGC controls media gateways, MG1, MG2 and MG3, in which the media gateway controller MGC and the media gateway MG3 locate in network 1, the media gateway MG1 locates in network 3, the media gateway MG2 locates in network 2, and it needs to pass network 2 going between network 1 and network 3. Thus agent equipment 1 is provided between network 1 and network 2, and agent equipment 2 is provided between network 2 and network 3. MEGACO protocol is adopted between the media gateway controller MGC and media gateways MG1, MG2 and MG3. The agent equipment for the media gateway controller and the media gateway located in different networks is an independent equipment to provide a function of signaling and media agent among networks in a packet switching network, which is for supplying signaling and media agent among different networks and network address translation.

Agent equipment 1 has at least two network addresses, in which one is a first network address in network 1 of the media gateway controller MGC side, and other one is a second network address in network 2 of media gateway MG2 side. IP address and port of the media gateway controller configured on media gateway MG2 is the second network address and corresponding port of agent equipment 1. In the same way, agent equipment 2 has also at least two network addresses, in which one is a first network address in network 2 beside media gateway MG2, and other one is a second network address in network 3 of media gateway MG1 side. IP address and port of the media gateway controller MGC configured on media gateway MG1 is the second network address and corresponding port of agent equipment 2.

The message identifier (MID) of the MEGACO signaling sent by the media gateway comprises the domain name of the media gateway, IP address or equipment name, and so on; whereas the message identifier (MID) of the MEGACO signaling sent by the media gateway controller MGC comprises both message identifiers (MID) of the media gateway controller and message identifiers (MID) of the destination media gateway.

Message identifier (MID) of each media gateway under control of a same media gateway controller is unique, so the media gateway controller could identify unique media gateway MG in accordance with its message identifier MID.

The present invention will be described by a process for realizing signaling agent between the media gateway controller MGC and media gateway MG2 through agent equipment 1, shown in FIG. 1. The basic steps of the present invention are the following:

Firstly, the media gateway MG registers to the media gateway controller MGC. The agent equipment dynamically records the message identifier MID of the media gateway MG to be registered and the network address according to register message sent by the media gateway MG. After the media gateway MG registers successfully, for every MEGACO signaling, the agent equipment could obtain information on corresponding media gateway according to message identifier MID in the signaling, and complete forwarding MEGACO message between the media gateway MG and the media gateway controller MGC.

Secondly, for MEGACO signaling unconcerned with media stream port, the agent equipment directly forwards in accordance with message identifier MID.

Then, after the agent equipment receives a MEGACO signaling for adding or modifying media stream port sent to the media gateway MG by the media gateway controller, corresponding media stream forwarding port and forwarding table are added or modified on the agent equipment; relevant media stream network address information in the MEGACO signaling is replaced with information on corresponding network address of media stream forwarding port on the agent equipment and then the signaling is forwarded to corresponding media gateway MG.

After the media gateway MG processes the signaling, a reply signaling is returned to the media gateway controller MGC.

After receiving the reply signaling relevant to media stream network address returned to the media gateway controller from the media gateway, the agent equipment modifies a forwarding table of corresponding media stream forwarding port, replaces media information in the signaling with information on corresponding network address of media stream forwarding port on the agent equipment, and sends to the media gateway controller MGC. If the signaling is a reply signaling for establishing media stream port, termination ID of media stream port for the media gateway MG should be also recorded on the agent equipment.

When calling finishes, the media gateway controller MGC sends a subtract signaling for releasing media stream port to the media gateway, the agent equipment releases corresponding media stream forwarding port in accordance with the termination ID, and forwards the signaling to corresponding media gateway MG.

Figure 3:
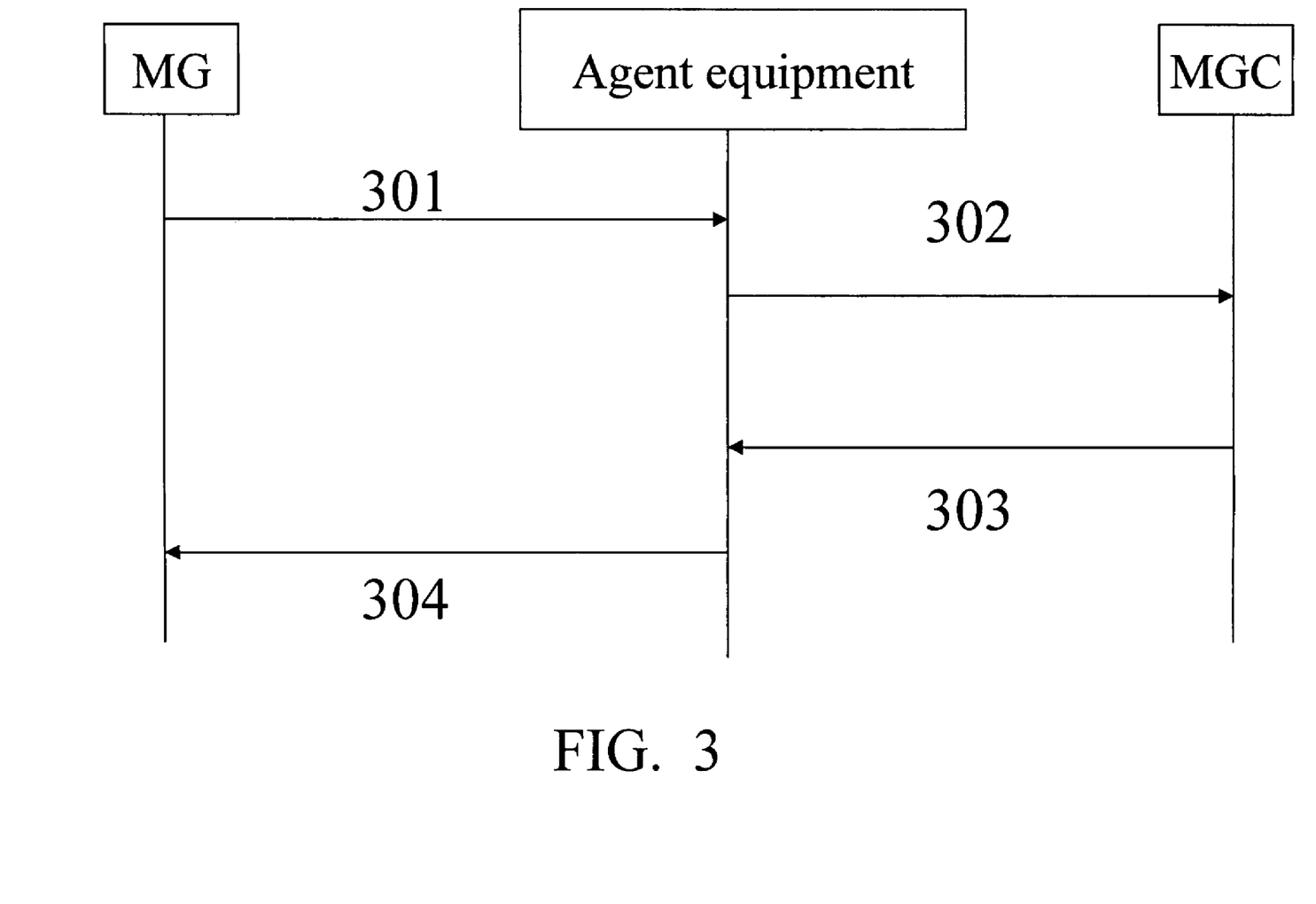
FIG. 3 is an flow chart for dynamic generating media gateway information on the agent equipment according to the present invention.

FIG. 3 illustrates registering procedure of the media gateway.

Step 301: The media gateway MG sends a register (Service Change) message to the media gateway controller, the agent equipment receives the message on the second network address and corresponding port, records IP source address and port number of the media gateway MG sending the message and message identifier of this media gateway and so on, and generates a piece of information related to the media gateway.

Step 302: The agent equipment forwards the register message to the media gateway controller MGC from the first network address.

Step 303: The message Gateway Controller MGC accepts registering of the media gateway according to message identifier of the media gateway, and, after registering successfully, the media gateway controller MGC sends a reply signaling to the media gateway, in which the message identifier MID in the reply signaling includes MID information of the media gateway MG and the media gateway controller MGC.

Step 304: After receiving the reply signaling on the first network address, the agent equipment analyses MID information of the media gateway MG in the reply signaling, searches and obtains the address of the media gateway MG from information recorded, and then forwards the reply signaling to corresponding media gateway MG from the second network address.

After the media gateway registers successfully, for MEGACO signaling that is unconcerned with media steams and transmitted between the media gateway controller MGC and the media gateway MG, the agent equipment can forward directly in accordance with message identifier MID in the signaling; for the signaling concerned with media streams, the agent equipment replaces the media stream network address correspondingly, and then forwards according to the message identifier MID.

Figure 4:
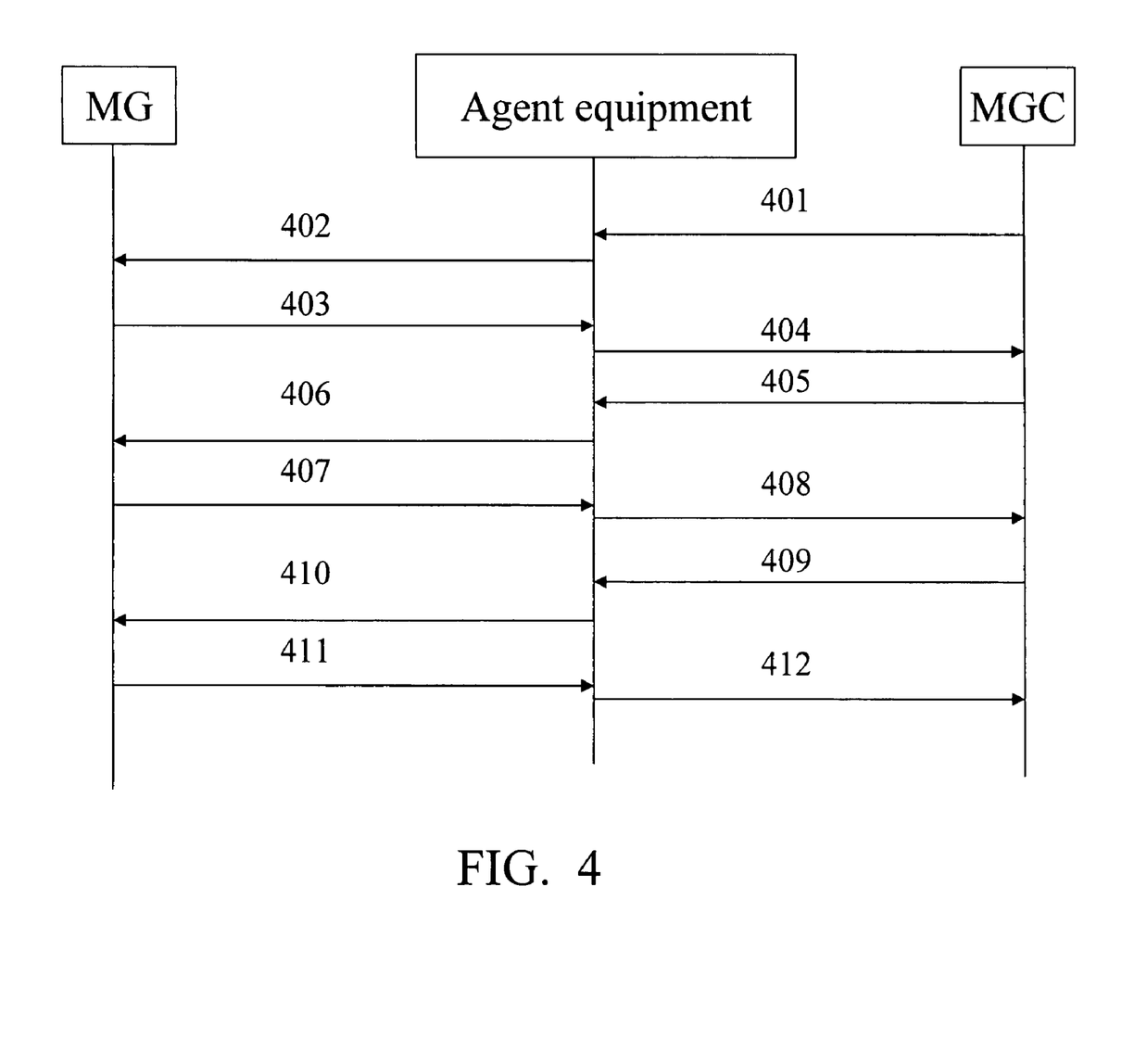
FIG. 4 is a schematic graph for realizing MEGACO signaling agent on the agent equipment according to the present invention.

FIG. 4 illustrates a process of forwarding media streams among networks by MEGACO signaling agent through the agent equipment according to the invention.

Step 401: The media gateway controller MGC sends add signaling to the media gateway for establishing media stream port on the media gateway MG, and after analyzing the signaling, the agent equipment establishes a corresponding media stream forwarding table and port on the agent equipment. If the add signaling includes remote media stream network address, IP address and port in the signaling are used for establishing a media stream forwarding table on media stream forwarding port, and then IP address and port in the signaling are modified to the second network address and media stream forwarding port of the agent equipment.

Step 402: The agent equipment forwards the add signaling with the modified remote media stream network address to the media gateway MG Step 403: After establishing media stream port successfully, the media gateway MG sends a reply for the add signaling; after receiving the reply, the agent equipment modifies corresponding media stream forwarding table on media stream forwarding port with IP address and port in the local media stream network address in the reply, replaces IP address and port in the local media stream network address in the reply signaling with the first network address and media stream forwarding port of the agent equipment, and meanwhile records media termination ID returned from the media gateway.

Step 404: The agent equipment forwards the reply signaling with modified local media stream network address to the media gateway controller MGC.

Step 405: When the media gateway controller MGC sends a modify (MODIFY) signaling for modifying media stream port on the media gateway MG to the media gateway, the agent equipment finds corresponding media stream forwarding port according to termination ID, modifies media stream forwarding table of media stream forwarding port with IP address and port of remote media stream network address in the MODIFY signaling, then modifies IP address and port in the signaling into the second network address of the agent equipment and corresponding media stream forwarding port.

Step 406: The agent equipment forwards the modify signaling with modified remote media stream network address to the media gateway MG.

Step 407: The media gateway MG returns a reply for a success modification on media stream port.

Step 408: The agent equipment directly forwards the reply message to the media gateway controller MGC.

Step 409: When calling finishes, the media gateway controller MGC sends a SUBTRACT signaling for releasing media stream port to the media gateway MG, and the agent equipment finds corresponding media stream forwarding port according to termination ID recorded above and releases the corresponding media stream forwarding port.

Step 410: The agent equipment forwards the SUBTRACT signaling to corresponding media gateway MG.

Step 411: The media gateway MG releases media stream port successfully, and sends a reply to the media gateway controller MGC.

Step 412: The agent equipment forwards the reply message to the media gateway controller MGC.

The method for realizing multiple traversing of media gateway MG through multiple networks by multiple agent equipments by multiple stages is similar to the process above; each agent equipment only needs replace IP address and port number contained in media information in the signaling correspondingly with IP address and port of network 1 or network 2 in which the agent equipment locates, and establish corresponding media stream forwarding table; and when releasing, media stream forwarding table is released according to termination ID With the method of the present invention, the agent equipment needs not be configured any information related to the media gateway MG based on MEGACO protocol, and the media gateway MG is directly controlled by the media gateway controller. The media gateway controller MGC does not need to know the existence of an agent equipment between itself and the media gateway MG, and to concern whether the media gateway is in the same network as itself, which facilitates services implementing on the media gateway controller. The method of the present invention also highly facilitates user management, any change of service control on the media gateway MG only needs perform on corresponding media gateway controller without any modification on the agent equipment. Furthermore, multiple agent equipments may realize the media gateway traversing through multiple networks for many times, stage by stage.

It should be noted that the embodiments above are only for describing the solutions of the present invention but not for limiting, and an ordinary person skilled in the art should understand that various modifications and variations may be made in the present invention without departing from the spirit or scope of the invention, which all should be covered within the scope of the appended claims of the present invention.

What is claimed is:

1. A method for realizing signaling agent in a network system, the network system comprising media gateways and a media gateway controller in different networks, and at least one agent equipment on a boundary of different networks where a MEGACO Media Gateway Control (MEGACO) Protocol is adopted between the media gateways and the media gateway controller, wherein the agent equipment has at least two network addresses: one being a first network address in a network of the media gateway controller and the other one being a second network address in a network of a media gateway side, the method comprising the steps of:

step 1: a media gateway requesting to be registered to the media gateway controller, and the agent equipment dynamically recording message identifier of the media gateway to be registered and network address according to the register message;

step 2: for a MEGACO signaling that is unconcerned with a media stream port of the media gateway, the agent equipment directly forwarding the signaling according to a message identifier in the signaling; and step 3: for a MEGACO signaling that is concerned with the media stream port, the agent equipment processing media stream attributes correspondingly, and then forwarding the signaling according to the message identifier in the signaling, wherein step 3 further comprises the steps of:

(1) the agent equipment receiving the MEGACO signaling for establishing or modifying media stream port sent to the media gateway from the media gateway controller, establishing or modifying corresponding media stream forwarding port and forwarding table on the agent equipment, replacing relevant media information in the MEGACO signaling with corresponding network address information of media stream forwarding port on the agent equipment, and forwarding the signaling to corresponding media gateway;

(2) the media gateway processing MEGACO signaling received, and returning a reply signaling; if the MEGACO signaling is a signaling for creating a connection, further recording on the agent equipment a termination ID of the media gateway;

(3) the agent equipment modifying forwarding table of corresponding media stream forwarding port according to the reply signaling received, replacing media information in the signaling with corresponding network address information of media stream forwarding port on the agent equipment, and forwarding to the media gateway controller; and (4) the media gateway controller sending a subtract signaling for releasing media stream port to the media gateway after calling finishes, the agent equipment releasing corresponding media stream forwarding port after receiving the signaling, and forwarding the signaling to corresponding media gateway.

2. The method for realizing signaling agent of claim 1, wherein each media gateway under a same media gateway controller has a unique message identifier of the MEGACO signaling, and the media gateway controller distinguishes different media gateways by the message identifier.

3. The method for realizing signaling agent of claim 1, wherein the message identifier of each MEGACO signaling sent from the media gateway controller to the media gateway comprises the message identifier of the media gateway, and the agent equipment forwards the signaling to a corresponding media gateway according to the message identifier.

4. The method for realizing signaling agent of claim 1, wherein the IP address and port of the media gateway controller configured on the media gateway are same as the second network address and port of the agent equipment.

5. The method for realizing signaling agent of claim 1, wherein the registering procedure of step 1 comprises the steps of:

1) the media gateway sending the register message to the media gateway controller, the agent equipment receiving the message on the second network address and corresponding port, recording an IP source address, port number and message identifier of the media gateway sending the message, and generating a piece of information of the media gateway;

2) the agent equipment forwarding the registering message to the media gateway controller through the first network address;

3) the media gateway controller registering the media gateway according to the domain name thereof, after registering successfully, the media gateway controller returning a reply signaling to the media gateway, the message identifier of the reply signaling including information on domain names of the media gateway and the media gateway controller; and 4) the agent equipment receiving the reply signaling from the first network address, analyzing the domain name of the media gateway in the signaling, searching and obtaining address of the media gateway from information recorded, and forwarding to corresponding media gateway from the second network address.

6. The method for realizing signaling agent of claim 1, wherein step 3 further comprises the steps of: if the signaling received by the agent equipment is the reply signaling of establishing media stream port, recording a termination ID of the media stream port of the media gateway MG on the agent equipment, and determining media stream forwarding port for releasing according to the termination ID.

* * * * *